May 7, 1963 — W. A. ALEXANDER ETAL — 3,088,541
SEISMIC EXPLORATION
Filed Nov. 24, 1959 — 4 Sheets-Sheet 1

Warren A. Alexander
Joseph F. Bayhi — Inventors
By John D. Gassett — Attorney

Warren A. Alexander
Joseph F. Bayhi   Inventors

By John D. Gassett   Attorney

Warren A. Alexander
Joseph F. Bayhi

United States Patent Office 3,088,541
Patented May 7, 1963

3,088,541
SEISMIC EXPLORATION
Warren A. Alexander and Joseph F. Bayhi, Tulsa, Okla., assignors to Jersey Production Research Company, a corporation of Delaware
Filed Nov. 24, 1959, Ser. No. 855,069
4 Claims. (Cl. 181—.5)

This invention relates to geophysical prospecting. More particularly it concerns a system for producing seismic waves in the earth and includes the detecting of the reflections of such waves.

A method commonly employed for prospecting for oil or other mineral deposits is that known as seismic prospecting. Most commonly an explosive charge is detonated in a shot hole and the motion of the earth from the resulting seismic disturbance is detected at a number of points spread out in a desired pattern from the shot hole. Sensitive pickups or geophones are employed to translate the detected motion into electrical impulses which after suitable amplification are recorded. The seismograph record may be obtained in a number of ways including the use of moving coil galvanometers with mirrors attached and then arranged in such relation to a source of light and a moving strip of sensitized paper or film that there will be recorded on the paper or film a plurality of waveforms or tracks representing the seismic waves that have been picked up by the individual geophones. However, more recently it has been the more general practice to record seismic signals on reproducible recording means such as magnetic tape. From other data obtained in the area being studied, such as seismic wave velocities in the various earth layers, it has been possible for one skilled in the art to estimate the depths of the various reflecting substrata.

Recently there have been means described for generating seismic disturbances in an effort to generate more or less plane wavefronts or wavefronts in phase as they go through the earth. Various means have been suggested for doing this such as detonating a plurality of explosive charges positioned above the earth's surface but in close proximity thereto which is known as the air shooting technique. Although air shooting has been effective in some situations it has certain drawbacks, for example, such as air blast noise, air blast damage, and low frequency of reflections. And there is always a hazard present in the necessary handling of dynamite to position it properly above the surface of the earth. Other means for obtaining directional seismic wave propagation has been suggested such as the drilling of numerous shot holes in a desired arrangement and then placing an explosive charge in each one of them and shooting such charges with suitable time intervals to give a directed wavefront. However, this has a serious drawback from an economical standpoint as the cost of drilling the additional shot holes in which to place dynamite as well as the cost of the dynamite usually proves excessive. It is thus clear that there is a need for a system whereby seismic wavefronts may be directed without the use of explosives or the drilling of boreholes. Such a system is disclosed in this application.

Briefly, in a preferred embodiment, this invention concerns a system in which seismometers or seismic transducer units are distributed in a selected pattern, then are used interchangeably as transmitters and receivers. This system results in many improvements such as advantages in resolution, improved signal to noise ratio, directivity and economy. A seismic transducer unit is first connected to a source of energy, such as a suitable electrical generator or a highly charged condenser. The transducer unit is energized and transmits a seismic shock to the earth. After the desired signal is transferred to the earth, connections of each transducer unit are quickly switched to an amplifier which is connected to recording means in order that the returning detected signals may be recorded. The number of transducer units used depends on the size of the units, the size and nature of seismic disturbance desired, etc.

The nature and objects of the invention and the manner in which it is to be performed will be clearly understood from the following description and the accompanying drawings in which.

Figure 1:
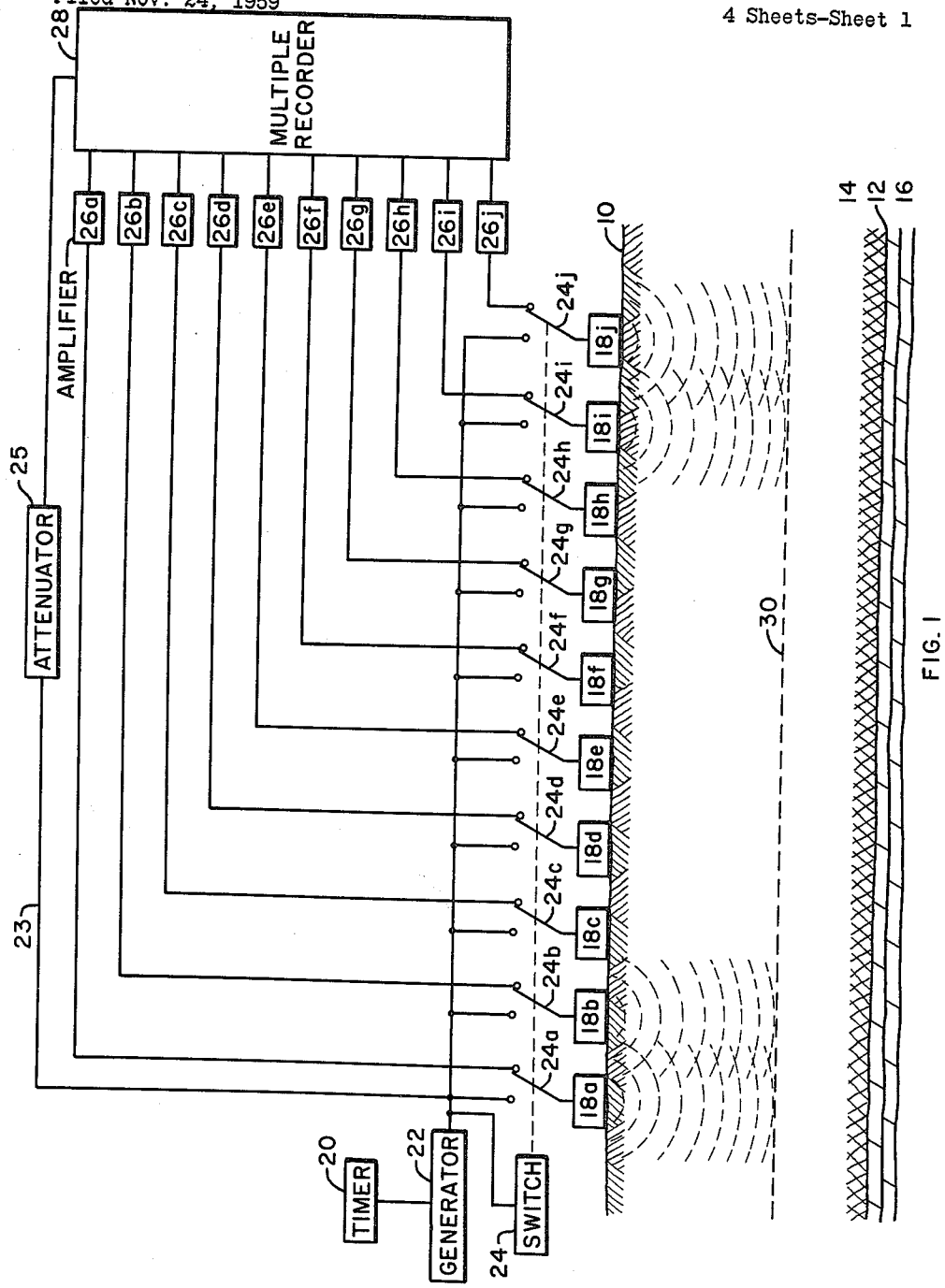
FIG. 1 is a diagrammatic representation of one embodiment of the invention.

Attention will now be directed to the drawings and in particular to FIG. 1 which illustrates in schematic form a vertical section of the earth being prospected and the diagrammatic arrangement of one embodiment of this invention. There is illustrated the surface of the earth 10, the subsurface interface 12 between strata 14 and 16. Mounted on the surface of the earth 10 are a plurality of seismic transducer units, 18–$a$ through 18–$j$. These transducer units may be arranged in various patterns. However, for the moment it is to be considered that they are evenly spaced linearly. A suitable seismic transducer unit is a "high-mass" ratio geophone, either conventional or self-oriented. A suitable high-mass ratio transducer unit is described and illustrated in the co-pending application of Alexander B. Hildebrandt, Serial No. 772,290, filed November 6, 1958.

Also illustrated in FIG. 1 is timer 20, generator 22, switching means 24, amplifiers 26–$a$ through 26–$j$, and a multiple recorder 28. Master switch means 24 is ganged or otherwise coupled to individual switches 24–$a$ through 24–$j$. Timer 20 may comprise a magnetic recorder which has recorded thereon the form of the signal desired to be transmitted to the earth. The signal may thus be repeated as desired, and is most frequently a mono-pulse signal. This signal is played back and fed to generator 22 which may be any suitable power amplifier which can put out large power for a short period. A suitable generator is a power amplifier, including various tube or electronic amplifiers such as those used with radar or in public address systems.

Switches 24–$a$ through 24–$j$ are two position switches. When generator 22 is energized switches 24–$a$ through 24–$j$ are in their first position, that is, they connect the output of the generator with the seismic transducer units 18–$a$ through 18–$j$. After switch 24 connects the output signal from generator 22 to transducer units 18–$a$ through 18–$j$ it automatically advances switches 24–$a$ through 24–$j$ to their second position, that is, it connects the seismic transducers 18–$a$ through 18–$j$ with amplifiers 26–$a$ through 26–$j$. Switch 24 preferably has a short delay in the switching action of switches 24–$a$ to 24–$j$. A suitable switch 24 is a mechanical relay type actuated by receiving a signal from timer 20. The mechanical delay inherent in mechanical relays can be adjusted to have such delay as may be desired. The normal delay of switching action of switch 24 is just sufficient time to permit the seismic transducers to be dampened after converting the electrical signal from generator 22 into a mechanical signal and introducing it into the earth as a seismic signal. This is usually about one-half cycle, or generally in the order of about 50 milliseconds.

Amplifiers 26–a through 26–j are preferably conventional amplifiers normally used with seismometers or geophones. The output from amplifier 26–a shown in the diagram is electrically connected to a multiple recorder 28. Recorder 28 is preferably a conventional recorder which is capable of recording up to 24 or more separate seismic signals simultaneously. A time line 23 connects the output of generator 22 with attenuator 25 which is connected to recorder 28. This provides a record on recorder 28 of the time the seismic disturbance is initiated.

In the operation of the apparatus shown in FIG. 1 a suitable or desired signal is placed on timer 20. This signal is preferably a mono-pulse signal which is described in detail in "The Form and Laws of Propagation of Seismic Wavelets," by Norman Ricker, Geophysics, vol. 18, No. 1, January 1953, and can be adjusted to any desired pulse breadth to attain the best signal to noise ratio in the reflection period. The signal may be the displacement form, or the velocity form with the pulse breadth ranging from 4 milliseconds to 100 milliseconds. This breadth can be controlled by the speed of the timer unit as will be more fully seen hereinafter. The selected signal which is played or reproduced from the recording timer means 20 is fed to generator 22. Generator 22 amplifies this signal such that the value of the mono-pulse may reach a peak value of a million watts.

The switching means when the timer starts is in a first position, that is, switches 24–a through 24–j connects generator 22 with the seismic transducer units 18–a through 18–j respectively. Upon receiving the mono-pulse from generator 22 each of the transducer units 18–a through 18–j transmit energy of a high magnitude with short duration to the earth's surface 10 thus imparting a seismic disturbance thereto. Each seismic transducer 18–a through 18–j transmits energy to the earth at the same time. The energy from each transducer starts out as a wavefront in the form of a sphere. However, after the energy has traveled the distance downwardly during the time approximately equal to the time that it takes the energy to travel through the earth the horizontal distance between the two seismic transducer units, the wavefronts from the various transducer units merge and form a wavefront which is substantially in the form of a plane as indicated at 30.

Wavefront 30 travels downwardly and encounters various discontinuities in the earth's substructure. These discontinuities, such as interface 12, reflect a portion of the energy of the wavefront 30 back toward the surface of the earth. After a short delay, switch 24–a through 24–j is switched to its second position, that is connecting transducer units 18–a through 18–j to amplifiers 26–a through 26–j. This delay is used to permit the transducer units 18–a through 18–j to become dampened from the effects of the mono-pulse from generator 22. The delay of the switching can be controlled; however, it is preferred that the delay be not over one half-cycle of the pulse; i.e., as small as 4 milliseconds and as much as 100 milliseconds but usually about 50 milliseconds. Assuming a velocity of 3,000 feet per second and a pulse of 40 milliseconds breadth and a duration of 160 milliseconds, this will permit complete recovery of all signals reflected from the depth of greater than about 300 feet. The needed switching delay can be shortened if the dampening effect of the transducer units 18–a through 18–j is reduced or if the pulse length is shortened. The energy reflected from wavefront 30 from interface 12 is then detected by the transducers 18–a through 18–j. A signal representing the energy thus detected is passed through switching means 24–a through 24–j (which is in a second position) to amplifiers 26–a through 26–j and then recorded on multiple recorder 28 in a conventional manner.

Figure 2:
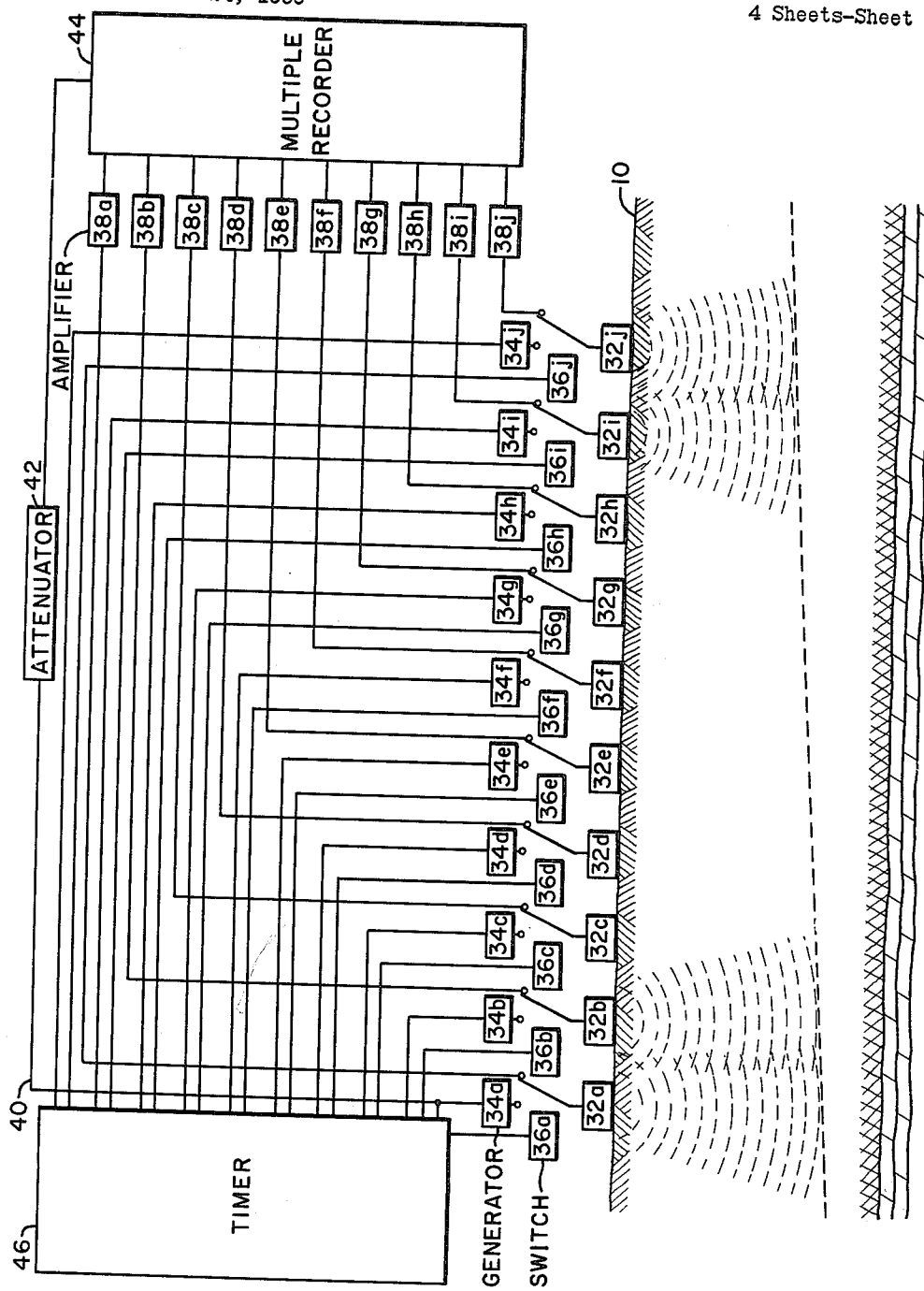
FIG. 2 is a diagrammatic representation of another embodiment of this invention.

Attention will now be directed to FIG. 2 which illustrates another embodiment of, and the best mode contemplated, for practicing this invention. It will be noted that there are a series of seismic transducer units 32–a through 32–j placed on the surface 10 of the earth. In this embodiment there is a separate generator 34–a through 34–j for each of the transducer units 32–a through 32–j respectively. Generators 34–a are connectable to transducer units 32–a through two position switches 36–a through 36–j respectively. A second position of these switches connects the geophone units 32–a through 32–j with amplifiers 38–a through 38–j respectively.

Transducer units 32–a through 32–j are similar to transducer units 18–a through 18–j; and generators 34–a through 34–j are similar to generator 22. Switches 36–a through 36–j are preferably of a character to connect a transducer unit alternately with its generator and the recording means upon receiving a switching pulse as is more fully explained hereinafter.

Figure 6:
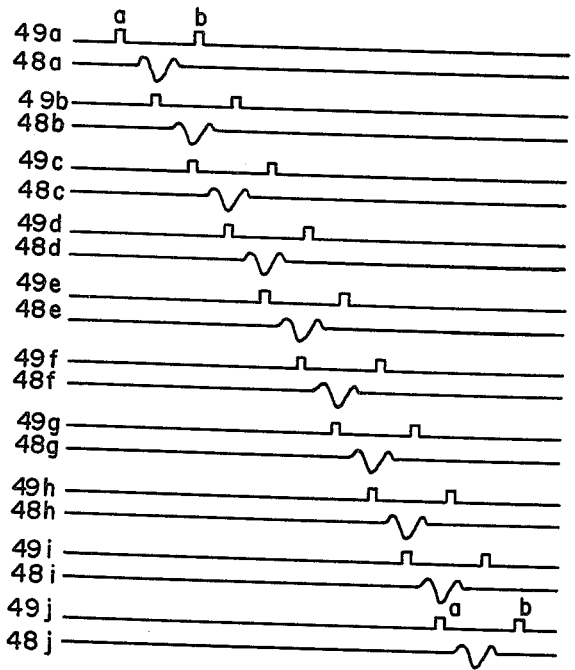
FIG. 6 illustrates signals spaced timewise for triggering the generators which energize the seismic transducer units.
Figure 7:
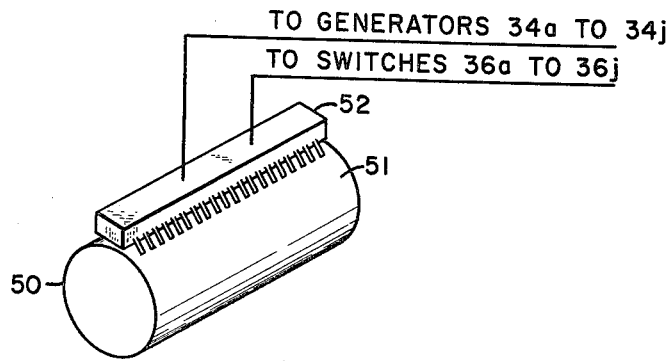
FIG. 7 illustrates means for reproducing the signal illustrated in FIG. 6.

A time line 40 connects the first generator 34–a with attenuator 42 so that the occurrence of the first energy through generator 34–a may be recorded on multiple recorder 44. Timer 46 is electrically connected to each generator 34–a through 34–j. Timer 46 may conveniently comprise a multiple channel magnetic recording medium, there being one channel for each generator 34–a through 34–j and the desired signal is impressed timewise upon each channel in relation to the other channels on the recording medium in the desired sequence of exciting generators 34–a through 34–j. There is also one channel for each switch 36–a through 36–j. One arrangement of signals is illustrated in FIG. 6 showing signals 48–a to 48–j and switching signals 49–a to 49–j which are conveniently placed upon a magnetic recording medium. In FIG. 7 there is illustrated a multi-head magnetic pickup 52 which is conveniently used to pick up the signals from the various channels of the magnetic recording medium 51, preferably magnetic tape, which is mounted on rotatable drum 50. As drum 50 rotates, the signals (48–a through 48–j) are picked up and are fed through connecting lines to their respective generator 34–a through 34–j. Simultaneously switching signals 49–a to 49–j inclusive are picked up and fed to switches 36–a to 36–j respectively. Each switching signal 49–a through 49–j has two pulses "a" and "b." Pulse "a" causes switch 36–a through 36–j to connect each transducer unit with its respective generator. Pulse "b" causes switches 36–a through 36–j to connect each transducer unit with its respective amplifier for recording purposes. Pulse "a" occurs before, and pulse "b" after, the occurrence of its associated mono-pulse. Means are provided for rotating drum 50 at a uniform speed. This "uniform speed" can be changed however, and is a method used for changing the pulse breadth. Each switch, 36–a through 36–j, has a delay from the time its respective generator, 34–a through 34–j, generates its mono-pulse output to the time that the switch is advanced to its second position, thus connecting the transducer unit 32–a with its respective amplifier and its channel on the recording means. The delay is conveniently provided by the delay of pulse "b," time-wise, from its associated mono-pulse. Any desired delay can thus be obtained.

The graphic representation of the recorded mono-pulse signals 48–a through 48–j of FIG. 6 is illustrated thereon in one time sequences. It is, of course, understood that any time sequence desired may be recorded thereon, and that various type pulses could be used; however, it is normally preferred that a mono-pulse be used to excite each generator.

Figure 3:
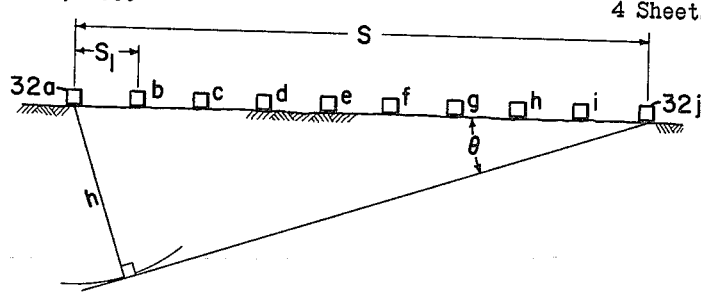
FIG. 3 is a diagrammatic representation of one method that may be employed for directing seismic energy along a selected path for optimum reflection from underlying strata.

The embodiment illustrated in FIG. 2 is quite useful for controlling the direction of the transmitted signal. For example, in FIG. 3 there are illustrated linearly spaced geophones 32–a through 32–j. For example, assume that it is desired to directionalize a wavefront having an angle θ from the horizontal. This is easily accomplished with this invention. In FIG. 3 assume that the seismic transducer units are equally spaced, then the set of signals as illustrated in FIG. 6 is prepared. They are prepared such that transducer unit 32–a is energized first, then 32–b and so forth in sequence until all the transducer units have been energized. The last transducer illustrated, namely 32–j, is energized when the energy from the transducer unit 32–a has reached a depth $h$ which is equal to S times the sin of θ where S is the distance between seismic transducer 32–a and 32–j, and θ is the desired angle between the wavefront and the horizontal as illustrated in FIG. 3. If seismic transducers 32–a through 32–j are spaced evenly and the low velocity layer is uniform, there is an equal time between the energizing of each transducer unit. The times between energizing each succesive transducer units is in proportion to the distance they are from each other. For example, transducer unit 32–b should be energized when the energy from transducer 32–a reaches the depth $h_1$ in which $h_1$ is equal to $S_1$ times the sin θ.

To further explain angular transmitting the following discussion illustrates how the time delay between energizing different transducer units is determined. It is assumed that it is desired to transmit a plane wavefront having an angle θ with the surface, assuming a level surface. First the sin of angle θ and the velocity $V_1$ of the near-surface material, commonly referred to as the low velocity level are determined. $V_1$ is normally determined by refraction methods. For a discussion of the determination of $V_1$ and its associated weathering corrections attention is directed to "Introduction to Geophysical Prospecting," by Dobrin, published by McGraw-Hill Book Company, Inc., New York, New York.

By referring to FIG. 3 the following may be developed.

$$\frac{h}{S} = \sin \theta$$

Time to travel distance $h$ is $$\frac{h}{V_1} = t_\theta$$

Time to travel S is $$\frac{s}{V_1} = t_s$$

$$\sin \theta = \frac{t_\theta}{t_s}$$

$$t_\theta = t_s \sin \theta$$

$$t_\theta = \frac{S}{V_1} \sin \theta$$

which is the time delay between transducer units spaced S distance apart in which θ is the selected angle of transmission and $V_1$ is the velocity of the near-surface material.

In discussing FIG. 3 it was assumed that geophones 32–a through 32–j were substantially laid out on a horizontal plane. In FIG. 3, if it is desired to have a horizontal wavefront it would only be necessary to energize all the transducers 32–a through 32–j simultaneously. Attention will now be directed toward FIG. 5 which illustrates how either a horizontal wavefront or a directional wavefront can be obtained in irregular country, that is area where there are hills and valleys or creek beds in which the transducer units must be set in order to obtain the desired pattern.

Figure 5:
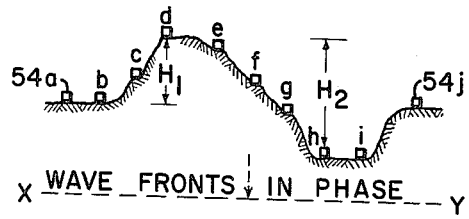
FIG. 5 illustrates the planting of transducers on an irregular surface.

In FIG. 5 there is illustrated a hill and a valley on which the transducer units 54–a through 54–j are desired to be spaced. Assume, for example, that it is desired to generate a horizontal wavefront XY. Instead of energizing all of the transducer units simultaneously, transducers on the hill are energized first and the transducer units in the valleys or river beds are energized last. The top geophone 54–d would be energized first and then the remaining transducer units would be energized when the energy wave through the earth from transducer unit 54–d reaches the same elevation as that particular transducer unit; then at that time that unit would be energized. For example, transducer 54–b would be energized a delayed time after 54–d was energized. This delay time is equal to the height $H_1$ divided by the velocity of energy in the earth at that level. Seismic transducer unit 54–h, for example, would be energized at a time (after the energizing of unit 54–d) equal to $H_2$ divided by V. H is normally determined by an elevation survey of the transmitting stations.

If it is desired to have a directed wavefront making an angle θ with respect to the horizontal in a situation as illustrated in irregular terrain shown in FIG. 5 the time delay shown in FIG. 3 for each individual transducer unit as illustrated above in relation FIG. 3 would be added to the time delay shown for each individual transducer in FIG. 5. This is so because FIG. 5 shows how to obtain a horizontal wavefront when seismic transducers are spaced on hills and valleys or different elevations. The wavefront XY in FIG. 5 then is the same wavefront as would be generated in FIG. 3 if all the seismic transducers 32–a through 32–j (same elevation as illustrated in FIG. 3) were simultaneously energized, i.e., the wavefront is horizontal. All that is required in order to directionalize wavefront XY is to add the delays shown above in relation to FIG. 3 to the delays discussed in relation to FIG. 5.

Figure 4:
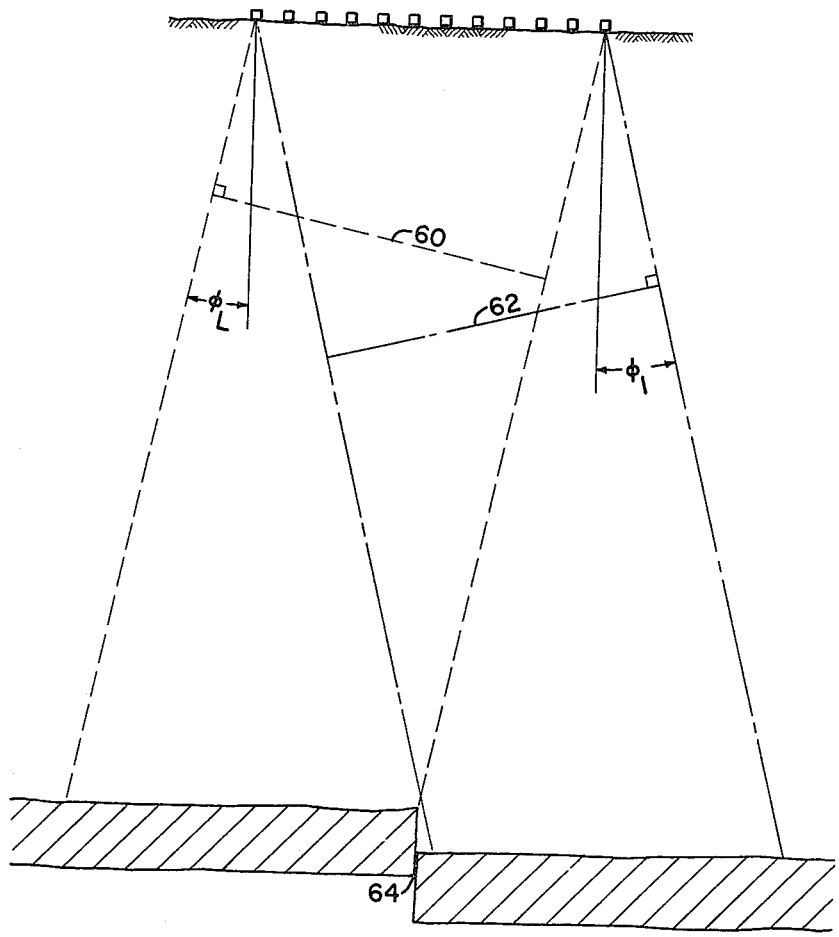
FIG. 4 illustrates use of the directional sending of seismic wavefronts in a plane form to detect underground characteristics.

FIG. 4 illustrates another variation of the system. In FIG. 4 a multiplicity of phase relations are used so that the transmitted signals will sweep or scan the subsurface as illustrated at different times by different wavefronts directed in different directions. A wavefront 60 is transmitted into the ground at one sequence of operation so that front 60 has an angle φ with the vertical. The second wavefront 62 and having an angle $φ_1$ with the vertical is transmitted in another direction. This system of scanning the subsurface is especially helpful in locating faults such as illustrated at 64.

This seismic system can be used to detail features at depth by "scanning" across a considerable part of the zone of interest. This is accomplished by adding together the signals recorded at the individual stations for successive values of θ. By referring to FIG. 4, it is evident that when signals recorded from transmission angles $φ_1$, $φ_2$, etc. to the right are added together, the greater the number, the better will the signal to noise ratio become; likewise for angles $φ_L$ to the left. But when signals recorded from angles within $φ_L$ to the left and $φ_1$ to the right are added, the resulting addition gives a lower signal to noise ratio. At some particular angle a minimum value of signal to noise ratio will attain, and this will uniquely locate a fault zone 64, if one is present as illustrated in FIG. 4.

While there has been shown certain embodiments utilizing straight line arrays of transducers it will, of course, be apparent to those skilled in the art that other transducer patterns may be arranged. The pattern selected will be determined by the expected characteristics of the area being surveyed as well as other factors known to those skilled in the art.

There are many advantages in using a system such as described herein. For example, there is a considerable economy due to the elimination of the drilling of shot holes and the use of explosives. This, of course, is also a safety feature. It is easier to "re-shoot" an area inasmuch as all that is necessary to do is replay the recording of the signals used to excite the generators and an exact duplication of the prior seismic pulses and their phase will be duplicated. The signal to noise ratio will be improved because of the addition of the reflection records from successive transmitters will give a linear increase of the signal while the noises increase at a slower rate. Higher resolution results from the scanning technique as illustrated with FIG. 4.

While there are disclosed herein but a limited number of embodiments of the inventiton, it is apparent that a number of modifications and changes may be made therein without departing from the spirit or scope thereof.

What is claimed is:

1. A method of determining subsurface irregularities using at least two seismic transducer units placed on the surface of the earth and a recording unit which comprises: energizing the first of said seismic transducer units; energizing the second seismic transducer unit the time $T_\theta$ after the energization of said first seismic transducer unit in which $$T_\theta = \frac{s}{V_1}$$

times sin $\theta$ in which $s$ is the distance between said transducer units, $\theta$ is the selected angle of transmission and $V_1$ is the velocity of the near surface material; thereafter connecting said transducer units to said recording means whereby reflection from said transmitted energy is detected by said transducer units and is then recorded; and repeating the energization of the first and second transducer units for a different value of $T_\theta$.

2. A method of seismic prospecting for determining subsurface irregularities using at least two seismic transducer units placed on the surface of the earth and a recording means which comprises:
    (a) energizing the transducer units in a fixed time sequence such as to have a wave front transmitted through the ground in one sequence of operations in which the wave front has an angle $\phi_L$ with the vertical;
    (b) thereafter connecting said transducer units to said recording means whereby reflections of said transmitted wave front are detected by said transducer units and are then recorded;
    (c) again energizing the seismic transducer units in a different fixed time sequence so as to have a second wave front having a different angle $\phi_1$ with the vertical and thereafter connecting the said transducer units to said recording means whereby reflections from said second wave front are detected by said transducer units and are then recorded.

3. A method as defined in claim 2 in which a plurality of wave fronts are sequentially generated and recorded having angles between $\phi_1$ and $\phi_L$.

4. A method of seismic exploration for determining subsurface irregularities using seismic transducer means placed on the surface of the earth and recorder means which comprises:
    (a) energizing said seismic transducer means in a fixed time sequence to produce a first wave front propagated through the earth having an angle of $\phi_1$ with the vertical;
    (b) thereafter connecting said transducer means to said recording means whereby reflection of said transmitted wave front from a subsurface strata is detected by said transducer means and is then recorded;
    (c) repeating steps $a$ and $b$ in which $\phi_1$ is a different value so as to scan across a considerable part of the zone of interest.

References Cited in the file of this patent

UNITED STATES PATENTS

| | | |
|---|---|---|
| 2,555,806 | Mitchell | June 5, 1951 |
| 2,706,011 | Bayhi | Apr. 12, 1955 |
| 2,745,507 | Bodine | May 15, 1956 |
| 2,894,596 | Flatow et al. | July 14, 1959 |
| 2,923,366 | Meiners et al. | Feb. 2, 1960 |
| 3,022,851 | Hasbrook | Feb. 27, 1962 |